US011895766B2

(12) United States Patent
Blahnik et al.

(10) Patent No.: US 11,895,766 B2
(45) Date of Patent: Feb. 6, 2024

(54) LINEAR ACCELERATOR ASSEMBLY INCLUDING FLEXIBLE HIGH-VOLTAGE CONNECTION

(71) Applicant: Applied Materials, Inc., Santa Clara, CA (US)

(72) Inventors: David T. Blahnik, Round Rock, TX (US); Charles T. Carlson, Cedar Park, TX (US); Robert B. Vopat, Austin, TX (US); Frank Sinclair, Boston, MA (US); Paul J. Murphy, Reading, MA (US); Krag R. Senior, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 182 days.

(21) Appl. No.: 17/502,279

(22) Filed: Oct. 15, 2021

(65) Prior Publication Data

US 2023/0120769 A1 Apr. 20, 2023

(51) Int. Cl.
*H05H 7/22* (2006.01)

(52) U.S. Cl.
CPC ......... *H05H 7/22* (2013.01); *H05H 2007/222* (2013.01)

(58) Field of Classification Search
CPC ........................... H05H 2007/222; H05H 7/22
See application file for complete search history.

(56) References Cited

U.S. PATENT DOCUMENTS

| | | | | |
|---|---|---|---|---|
| 6,208,095 | B1 * | 3/2001 | DiVergilio | H05H 7/18 315/505 |
| 10,928,157 | B1 * | 2/2021 | Busch, II | H05H 15/00 |
| 2004/0256578 | A1 * | 12/2004 | Mitchell | H01J 37/3171 250/492.21 |
| 2019/0088443 | A1 | 3/2019 | Satoh | |
| 2019/0371562 | A1 | 12/2019 | Sinclair | |
| 2021/0125810 | A1 | 4/2021 | Kowal | |

FOREIGN PATENT DOCUMENTS

| | | |
|---|---|---|
| JP | H11354298 A | 12/1999 |

OTHER PUBLICATIONS

International Search Report and Written Opinion for the International Patent Application No. PCT/US2022/041679, dated Dec. 22, 2022, 8 pages.

* cited by examiner

*Primary Examiner* — Henry Luong
(74) *Attorney, Agent, or Firm* — KDW Firm PLLC

(57) ABSTRACT

Embodiments herein are directed to a linear accelerator assembly for an ion implanter. In some embodiments, a LINAC may include a coil resonator and a plurality of drift tubes coupled to the coil resonator by a set of flexible leads.

17 Claims, 5 Drawing Sheets

LINEAR ACCELERATOR ASSEMBLY INCLUDING FLEXIBLE HIGH-VOLTAGE CONNECTION

FIELD OF THE DISCLOSURE

The present disclosure relates generally to high-energy ion implanters and, more particularly, to flexible high-voltage connections for linear accelerator assemblies of ion implanters.

BACKGROUND OF THE DISCLOSURE

Ion implantation is a process of introducing dopants or impurities into a substrate via bombardment. Ion implantation systems include an ion source and a series of beam-line components. The ion source may comprise a chamber where ions are generated. The ion source may also include a power source and an extraction electrode assembly disposed near the chamber. The beam-line components may include, for example, a mass analyzer, a first acceleration or deceleration stage, a collimator, and a second acceleration or deceleration stage. Much like a series of optical lenses for manipulating a light beam, the beam-line components can filter, focus, and manipulate ions or an ion beam having particular species, shape, energy, and/or other qualities. The ion beam passes through the beam-line components and may be directed toward a substrate mounted on a platen or clamp.

Implantation apparatuses capable of generating ion energies of approximately 1 MeV or greater are often referred to as high-energy ion implanters, or high-energy ion implantation systems. One type of high-energy ion implanter is a linear accelerator, or LINAC, in which a series of electrodes arranged as tubes conduct and accelerate the ion beam to increasingly higher energy along the succession of tubes, where the electrodes receive an AC voltage signal. Standard LINACs may be driven by 10-20 MHz signal using a resonator circuit including a coil and a capacitor. In some cases, the coil is subjected to a large electrical power load which requires cooling. Typical systems of this type have large, stiff coil ends that connect to drift tube apertures, leading to an over-constrained system. As a result, in the event of thermal expansion and/or a higher Q-factor, failures may occur.

What is therefore needed is a LINAC with increased flexibility.

SUMMARY OF THE DISCLOSURE

This Summary is provided to introduce a selection of concepts in a simplified form further described below in the Detailed Description. This Summary is not intended to identify key features or essential features of the claimed subject matter, nor is the summary intended as an aid in determining the scope of the claimed subject matter.

In one approach, a linear accelerator assembly may include a coil resonator and a plurality of drift tubes coupled to the coil resonator by a set of flexible leads.

In another approach, an ion implanter may include an ion source operable to generate an ion beam, and a linear accelerator assembly operable to receive the ion beam. The linear accelerator assembly may include a coil resonator, and a plurality of drift tubes coupled to the coil resonator by a set of flexible leads.

In yet another approach, a linear accelerator assembly may include a coil resonator comprising a helical section and a set of inductive coupling arms extending from the helical section, and a plurality of drift tubes coupled to each inductive coupling arm of the set of inductive coupling arms by a flexible lead.

BRIEF DESCRIPTION OF THE DRAWINGS

The accompanying drawings illustrate exemplary approaches of the disclosure, including the practical application of the principles thereof, as follows.

Figure 1:
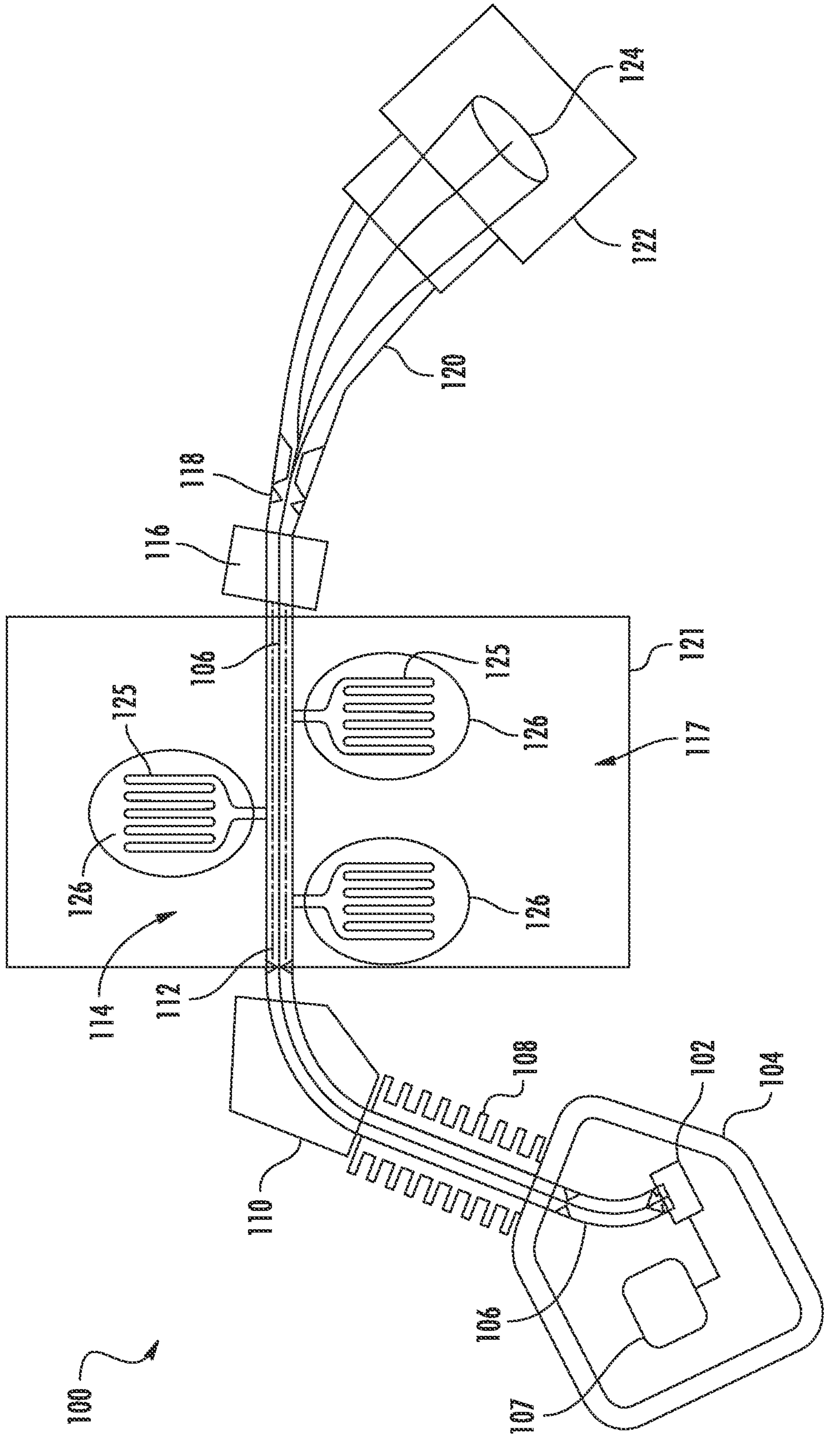
FIG. 1 is a schematic view illustrating an ion implanter in accordance with embodiments of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Ion implanters and linear accelerators in accordance with the present disclosure will now be described more fully hereinafter with reference to the accompanying drawings, where embodiments of the ion implanters and linear accelerators are shown. The ion implanters and linear accelerators may be embodied in many different forms and are not to be construed as being limited to the embodiments set forth herein. Instead, these embodiments are provided so this disclosure will be thorough and complete, and will fully convey the scope of the disclosure to those skilled in the art.

Provided herein is an improved high-energy ion implantation system, which may also be referred to herein as an "ion implanter" for the sake of brevity. Various embodiments provide novel configurations for generating high-energy ions, where the final ion energy delivered to a substrate may be 1 MeV or greater. One aspect of embodiments of the present disclosure is a novel LINAC assembly, providing various advantages over known beamline architectures, including a flexible connection between various components.

In exemplary embodiments, a LINAC assembly includes one or more flexible connectors or leads coupling a coil resonator and a plurality of drift tubes. Each flexible lead, which may be a wire or conductive ribbon, enables more degrees of freedom in mechanical motion to provide a moveable/tunable aperture set of the drift tubes and a large m/q and energy span on the LINAC. Embodiments herein reduce problems of over-constrained conditions, which may lead to unwanted motion due to vibration and thermal expansion. Advantageously, the LINAC of the present disclosure avoids problems such as broken support insulators, de-tuned beam shape, and the inability to stay on resonance and to couple power from an RF generator to the coil and then to the beam.

A further advantage of the LINAC of the present disclosure is the reduction of capacitance due to the use of a relatively smaller wire or ribbon of the leads. As capacitance is reduced and frequency is fixed, an increase in coil inductance is generated. Higher inductance to the RF Coil resonator beneficially provides inductive voltage transformation, which leads to a higher voltage at the drift tubes for a given RF input system power.

Referring now to FIG. 1, an exemplary ion implanter (hereinafter "implanter") 100 is shown in block form. The implanter 100 may represent a beamline ion implanter, with some elements not shown for clarity of explanation. The implanter 100 may include an ion source 102 and a gas box 107 disposed in a terminal 104. The ion source 102 may include an extraction system including extraction components and filters (not shown) to generate an ion beam 106 at a first energy. Although non-limiting, the first ion energy may range from 5 keV to 100 keV. The implanter 100 may further include a DC accelerator column 108, disposed downstream of the ion source 102. The DC accelerator column 108 is operable to accelerate the ion beam 106 to a second ion energy, where the second ion energy is greater than the first ion energy.

The implanter 100 may further include an analyzer 110 operable to analyze the accelerated ion beam 106, for example, by changing the trajectory of the ion beam 106. In some embodiments, the implanter 100 may also include a buncher 112 and a linear accelerator assembly 114 within a chamber 117 (e.g., vacuum chamber) of a housing 121, the linear accelerator assembly 114 disposed downstream of the DC accelerator column 108 and the analyzer 110. During use, the linear accelerator assembly 114 is operable to accelerate the ion beam 106 to a third energy, greater than the second energy.

The linear accelerator assembly 114 may include a plurality of accelerator stages 126, each including one or more coils 125, as will be further described herein. In some embodiments, the accelerator stages 126 of the linear accelerator assembly 114 may be double gap accelerator stages, while in other embodiments the accelerator stages 126 may be triple gap accelerator stages. In particular embodiments, the linear accelerator assembly 114 may include at least three triple gap accelerator stages. Embodiments are not limited in this context, however. In various embodiments, the implanter 100 may include additional components, such as filter magnet 116, a scanner 118, and a collimator 120, which together deliver high-energy ion beam 106 to an end station 122 for processing a substrate 124.

Figure 2:
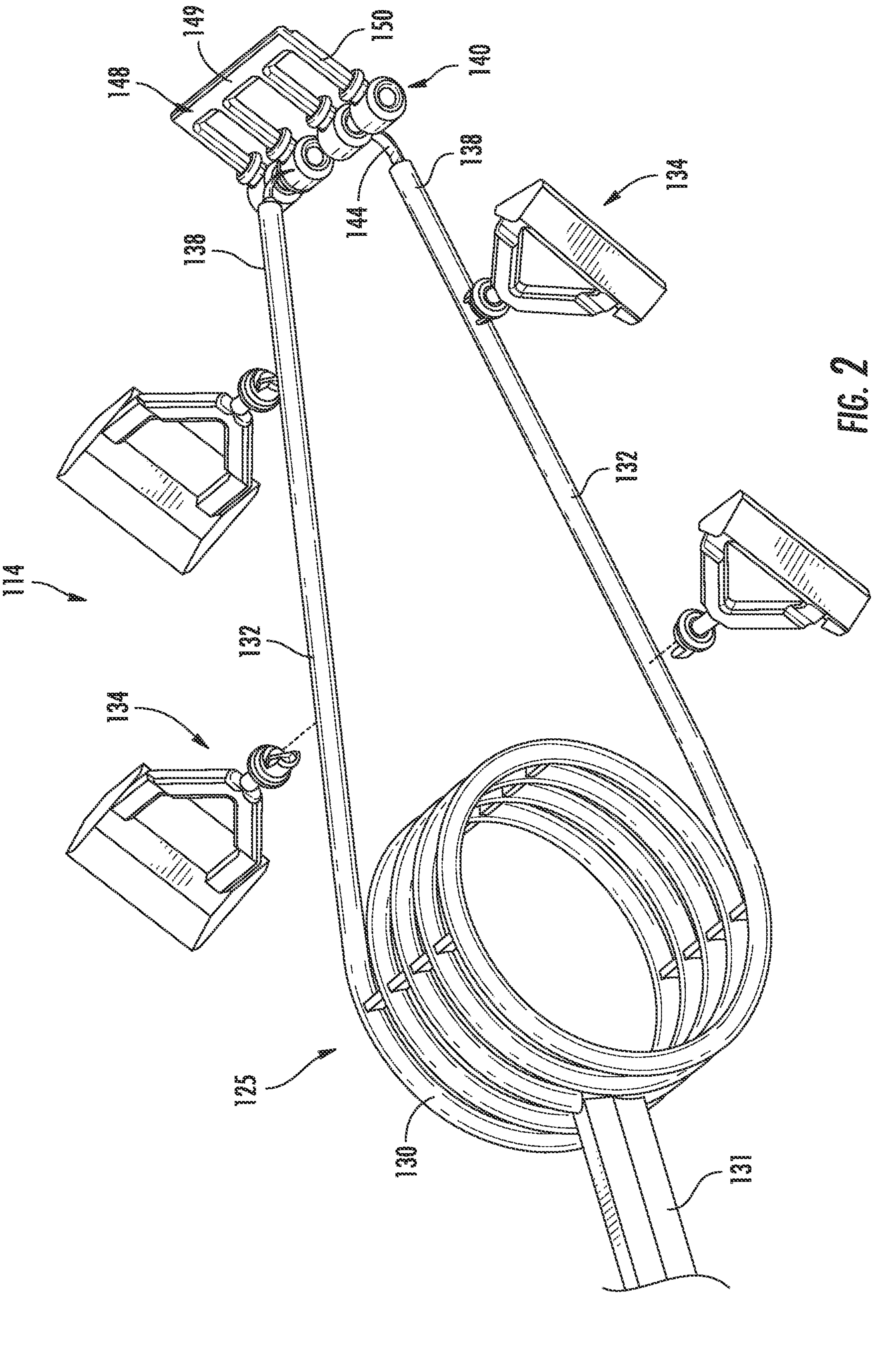
FIG. 2 is a first perspective view of a LINAC accelerator assembly in accordance with embodiments of the present disclosure
Figure 3:
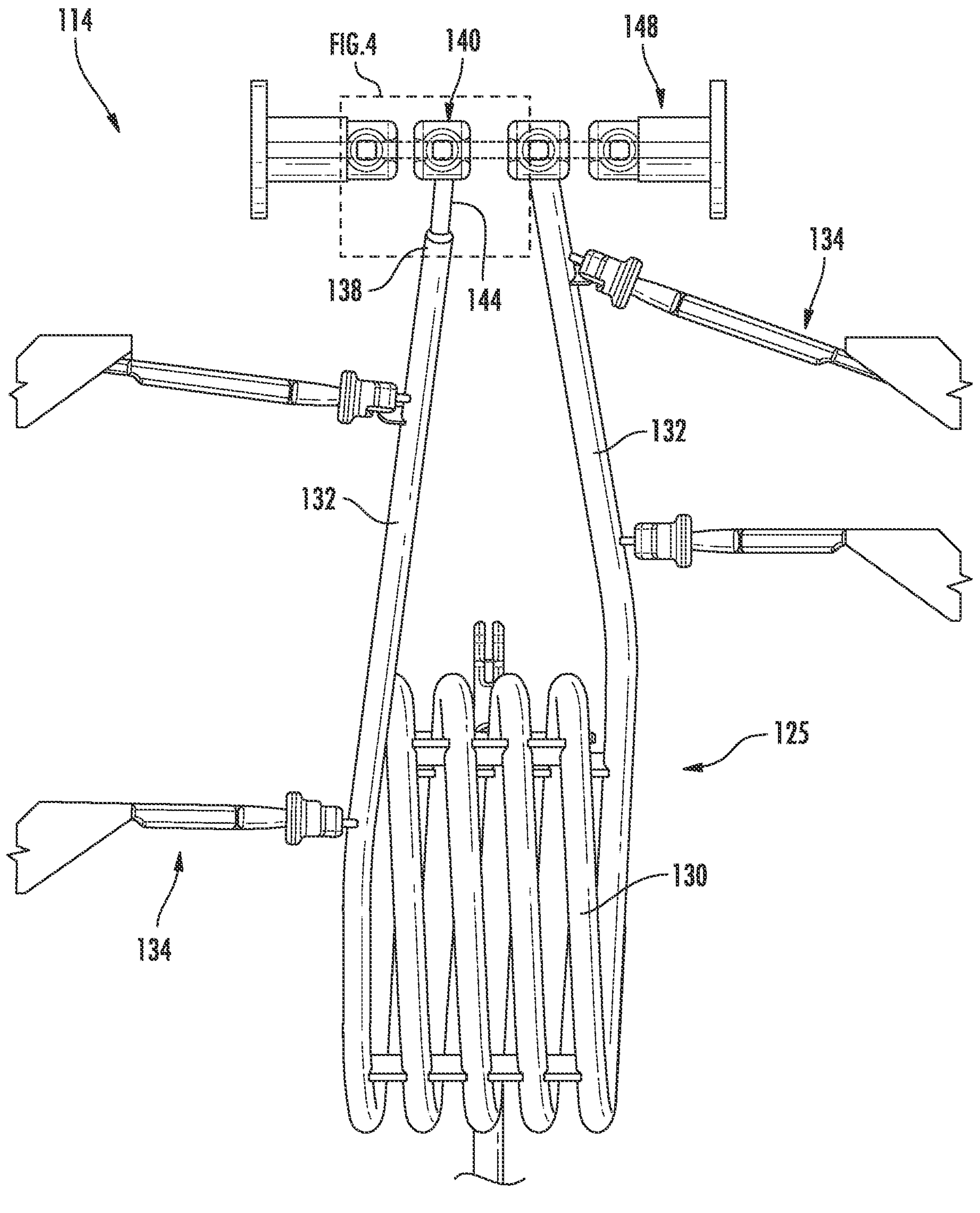
FIG. 3 is a second perspective view of the LINAC accelerator assembly in accordance with embodiments of the present disclosure.

FIGS. 2-3 demonstrate a portion of an example linear accelerator assembly 114 according to embodiments of the present disclosure. As shown, the linear accelerator assembly 114 may include the coil 125, which may be a coil of an RF coil resonator. The coil 125 may include a toroidal or helical section 130 secured by one or more helical supports 131. Although not shown, the helical support 131 may be coupled to a wall of the housing 121 of the chamber 117 (FIG. 1). Extending from the helical section 130 is a set of inductive coupling arms 132 (hereinafter "arms"). As shown, the arms 132 extend from opposite ends of the helical section 130. Each of the arms 132 may be coupled to one or more support elements 134, which may be coupled to the wall of the chamber 117. In some embodiments, the support elements 134 may constrain the arms 132 while also allowing some degree of flexibility or movement of the arms 132.

Although non-limiting, the coil 125 may be made of hollow tubing with an approximately circular cross section. In some embodiments, the coil 125 is a copper tube defining an internal channel to permit a cooling fluid to flow therethrough. For example, internally flowing water within the coil 125 may help dissipate heat generated by current traveling along the conductive material of the coil 125.

Each of the arms 132 may include a free end 138 coupled to a plurality of drift tubes 140 by a lead 144. As will be described in greater detail herein, each lead 144 may include one or more flexible connectors (e.g., wire, ribbon, tube, tape, band, etc.) of conductive material operable to support electrical and thermal loads for the application. Coupled to the drift tubes 140 may be an insulator support 148. Although not limited to any particular configuration, the insulator support 148 may include a crossbar 149 and a plurality of fingers 150 each coupled to a corresponding drift tube 140. The insulator support 148 may be coupled to the wall of the chamber 117.

As used herein, the term "drift tube" may indicate a cavity or region of a beamline surrounded by a conductor at a controlled potential so no electric fields penetrate into the interior of the drift tube 140, but the electric fields are confined to the entrance and exit regions of the drift tube 140. Thus, charged particles will travel at a constant speed or "drift" through each drift tube 140. A high frequency generator may generate a radio frequency signal, such as 20 MHz or greater, and in some embodiments, may generate a 40 MHz signal. The linear accelerator assembly 114 may be configured as a step-up transformer to act as a voltage source to generate a high voltage, high frequency signal, such as a radio frequency voltage signal. This high voltage signal is used to control the voltage of the drift tubes 140 and thus define the acceleration provided by the accelerator stage 126 (FIG. 1).

Figure 4:
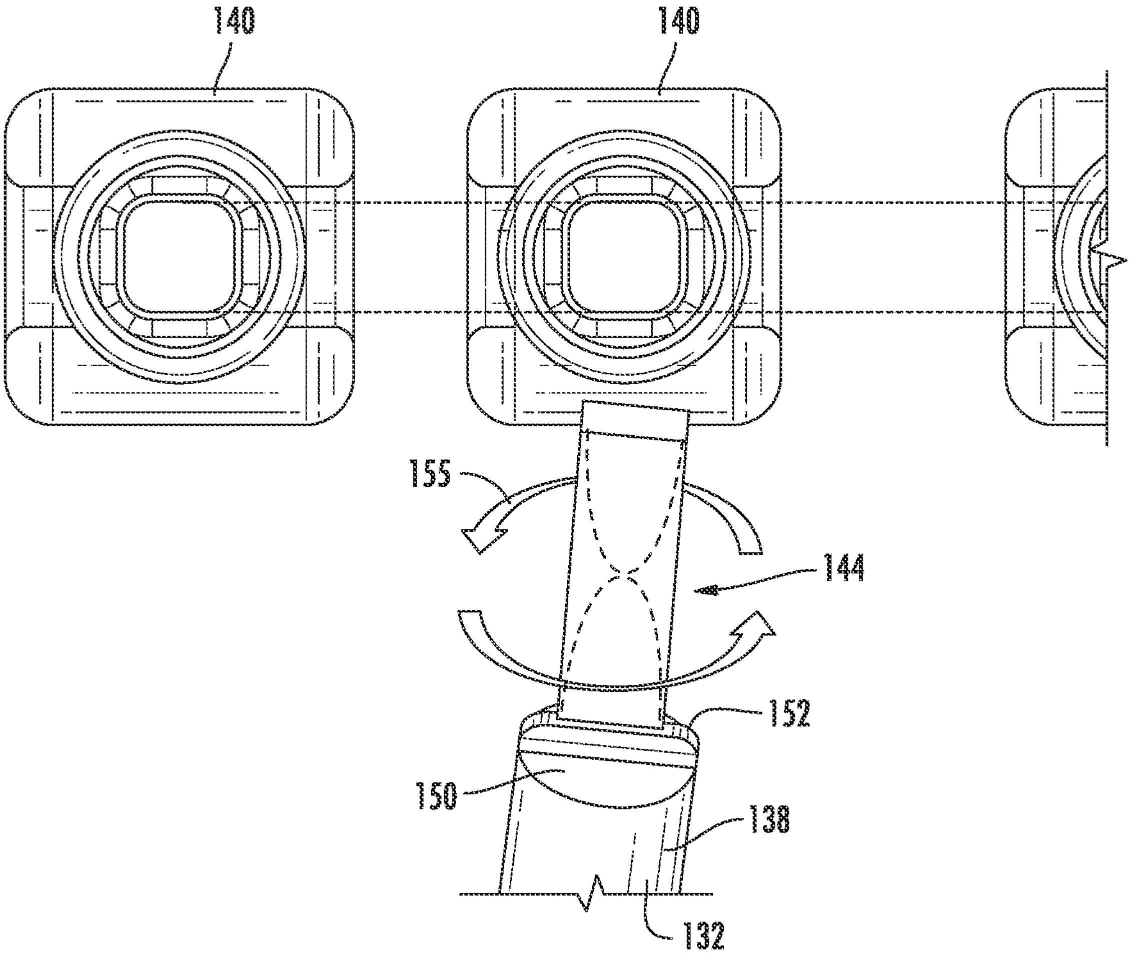
FIG. 4 is a first close-up view of a connection between components of the linear accelerator assembly in accordance with embodiments of the present disclosure.
Figure 5:
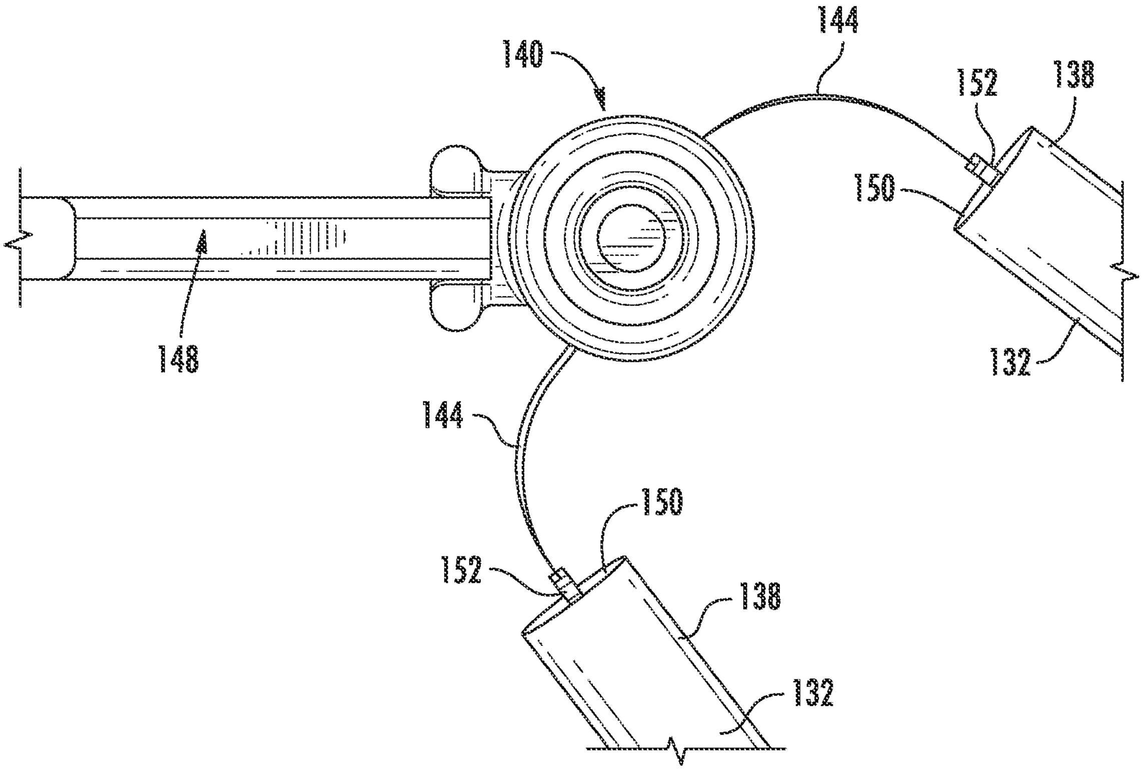
FIG. 5 is a second close-up view of the connection between components of the linear accelerator assembly in accordance with embodiments of the present disclosure.

Turning to FIGS. 4-5, close-up views of the connection between the arms 132 and the drift tubes 140 are shown. In some embodiments, the leads 144 may be a ribbon of flexible, conductive material coupled between the free end 138 of each arm 132 and the drift tubes 140. The free end 138 of the arm 132 may include a distal-most face 150 including a fastener 152 for retaining a first end of each lead 144. Although non-limiting, the fastener 152 may include a slot for receiving the lead 144. In other embodiments, the fastener 152 and the lead 144 may be integrally formed. It will be appreciated that the leads 144 may be coupled to the drift tubes in a variety of ways.

As demonstrated in FIG. 4 by arrows 155, the leads 144 permit movement in three dimensions. For example, the leads 144 may be twisted, bent, stretched, etc., to permit movement of the arms 132 and the drift tubes 140 relative to one another. Although not limited to any particular dimensions or configuration, the leads 144 may be sufficiently thin to permit flexibility, while also being thick enough to support the electrical and thermal load for the application. For example, the leads 144 may be a conductive material with a minimum of 5× skin depth and a maximum thickness based on power and cooling requirements, wherein skin depth is given by the following formula:

$$\text{Skin Depth} = \delta = \sqrt{\frac{\rho}{\pi f \mu}} = \sqrt{\frac{\rho}{\pi f \mu_r \mu_o}}$$

-continued

Where, $\rho$ = Resistivity of the Material $f$ = Frequency $\mu_r$ = Relative Permeability (usually 1)

$\mu_o$ = Permeabilty Constant = $4\pi \times 10^{-7}$

Although non-limiting, the leads 144 may be made from a thermally conductive base material, such as electrically pure copper or, for example, a tungsten-copper alloy. In some embodiments, the leads 144 may include a coating such as copper or silver and/or a protective coating, such as carbon.

In sum, embodiments of the present disclosure provide a high-performance LINAC by reducing transmission of vibration from the RF coil assembly to the drift tubes and vice-versa. Because high-Q coil resonator systems are very sensitive to mechanical vibrations, decreasing thermal expansion effects and any scenario that leads to a reduction in degrees of freedom of the physical system is advantageous. The LINAC of the present disclosure minimizes these negative effects on the system thereby enabling more consistent performance of the system.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Furthermore, identification references (e.g., primary, secondary, first, second, third, fourth, etc.) are not intended to connote importance or priority, but are used to distinguish one feature from another.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A linear accelerator assembly, comprising:
a coil resonator;
a plurality of drift tubes coupled to the coil resonator by a set of flexible leads; and
an insulator support comprising a crossbar and a plurality of fingers directly coupled to each drift tube of the plurality of drift tubes.

2. The linear accelerator assembly of claim 1, wherein each flexible lead of the set of flexible leads is a wire.

3. The linear accelerator assembly of claim 1, wherein each flexible lead of the set of flexible leads is a ribbon of conductive material.

4. The linear accelerator assembly of claim 1, wherein the coil resonator comprises a helical section and a set of inductive coupling arms extending from the helical section.

5. The linear accelerator assembly of claim 4, wherein each of the set of inductive coupling arms comprises a free end coupled to one of the set of flexible leads.

6. The linear accelerator assembly of claim 4, further comprising a support element coupled to each of the set of inductive coupling arms.

7. An ion implanter, comprising:
an ion source operable to generate an ion beam;
a linear accelerator assembly operable to receive the ion beam, the linear accelerator assembly comprising:
a coil resonator;
a plurality of drift tubes coupled to the coil resonator by a set of flexible leads; and
an insulator support comprising a crossbar and a plurality of fingers directly coupled to each drift tube of the plurality of drift tubes.

8. The ion implanter of claim 7, wherein each flexible lead of the set of flexible leads is a wire or a ribbon of conductive material.

9. The ion implanter of claim 7, wherein the coil resonator comprises a helical section and a set of inductive coupling arms extending from the helical section.

10. The ion implanter of claim 9, wherein each of the set of inductive coupling arms comprises a free end coupled to one of the set of flexible leads.

11. The ion implanter of claim 9, further comprising a support element coupled to each of the set of inductive coupling arms.

12. The ion implanter of claim 11, wherein the linear accelerator assembly is located within a chamber of a housing, and wherein the support element and the insulator support are coupled with the housing.

13. A linear accelerator assembly, comprising:
a coil resonator comprising a helical section and a set of inductive coupling arms extending from the helical section;

a plurality of drift tubes coupled to each inductive coupling arm of the set of inductive coupling arms by a set of flexible leads; and an insulator support comprising a crossbar and a plurality of fingers directly coupled to each drift tube of the plurality of drift tubes.

14. The linear accelerator assembly of claim 13, wherein each of the flexible leads comprises one or more conductive wires or one or more conductive ribbons.

15. The linear accelerator assembly of claim 13, wherein each of the set of inductive coupling arms comprises a free end coupled to the flexible lead.

16. The linear accelerator assembly of claim 13, further comprising a support element coupled to each of the set of inductive coupling arms.

17. The linear accelerator assembly of claim 13, wherein the coil resonator is a radio frequency (RF) coil resonator.

* * * * *